(12) United States Patent
Mueller et al.

(10) Patent No.: US 7,293,402 B2
(45) Date of Patent: Nov. 13, 2007

(54) INJECTION HEAD FOR A LIQUID-PROPELLED ROCKET ENGINE

(75) Inventors: Wolfgang Mueller, Moeckmuehl (DE); Christoph Tscherwitschke, Bretzfeld-Weisslensburg (DE)

(73) Assignee: EADS Space Transportation GmbH, Bremen (DE)

( * ) Notice: Subject to any disclaimer, the term of this patent is extended or adjusted under 35 U.S.C. 154(b) by 268 days.

(21) Appl. No.: 10/980,836

(22) Filed: Nov. 4, 2004

(65) Prior Publication Data
US 2006/0090453 A1      May 4, 2006

(30) Foreign Application Priority Data
Nov. 5, 2003    (DE) ................. 103 51 715

(51) Int. Cl.
*F02K 9/52*    (2006.01)
(52) U.S. Cl. ................................... 60/258
(58) Field of Classification Search ............ 60/258, 60/257
See application file for complete search history.

(56) References Cited

U.S. PATENT DOCUMENTS

| 3,071,925 | A | * | 1/1963 | Benedict et al. ............ 60/258 |
| 3,122,885 | A | * | 3/1964 | Heidmann .................. 60/258 |
| 3,132,481 | A | * | 5/1964 | Hasbrouck et al. ......... 60/258 |
| 3,603,092 | A |   | 9/1971 | Paine et al. |
| 3,625,435 | A |   | 12/1971 | Mitchell et al. |
| 4,586,226 | A |   | 5/1986 | Fakler et al. |
| 4,650,416 | A |   | 3/1987 | Warren, Jr. et al. |
| 5,161,379 | A | * | 11/1992 | Jones et al. ................ 60/258 |
| 6,253,539 | B1 | * | 7/2001 | Farhangi et al. ............ 60/258 |

FOREIGN PATENT DOCUMENTS

DE       38 18 623 C1       6/1988

OTHER PUBLICATIONS

George P. Sutton, et al., "Injectors", Rocket Propulsion Elements, 2001, pp. 271-276, Johy Wiley & Sons, Inc., New York, XP002316433.

* cited by examiner

*Primary Examiner*—Ted Kim
(74) *Attorney, Agent, or Firm*—Crowell & Moring LLP

(57) ABSTRACT

An injection head for a liquid-propelled rocket engine has a plurality of first and second injection bores for injecting jets of first and second propellant constituents, respectively, into the combustion chamber of a rocket engine, with mutual mixing of propellant constituents. The first injection bores are provided for injecting jets of the first propellant constituent with a high impulse, and the second injection bores are provided for injecting propellant jets of the second propellant constituent with a low impulse. In addition, the first and second injection bores are mutually arranged such that an admixing of the second propellant constituent to the first propellant constituent takes place under an ejector effect of the propellant jets of the first propellant constituent leaving the first injection bores.

5 Claims, 3 Drawing Sheets flow-through direction flow-through direction flow-through direction

*St. d. T.*

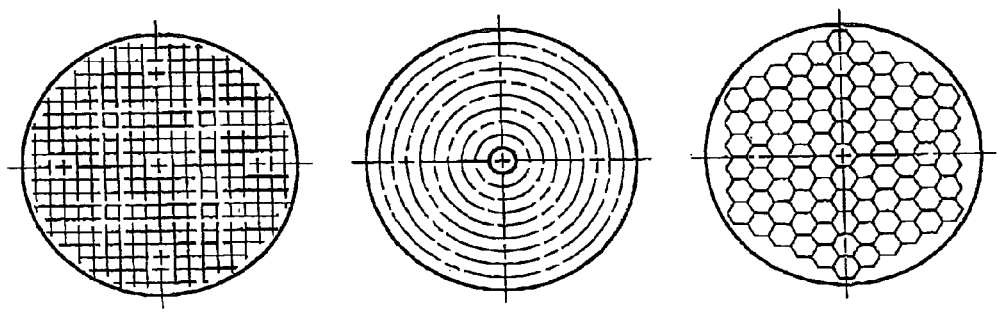
Fig. 4      a)                b)                c)
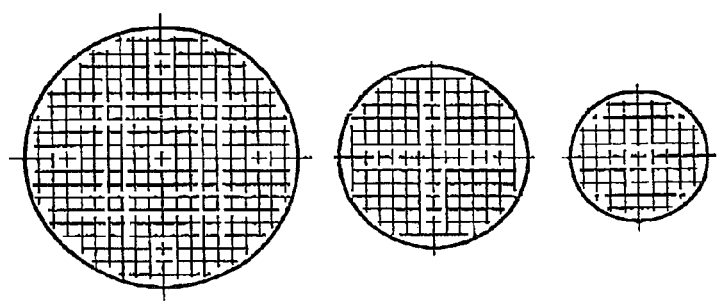
Fig. 5      a)           b)        c)

INJECTION HEAD FOR A LIQUID-PROPELLED ROCKET ENGINE

BACKGROUND AND SUMMARY OF THE INVENTION

This application claims the priority of German patent document No. 103 51 715.4, filed Nov. 5, 2003, the disclosure of which is expressly incorporated by reference herein.

The invention relates to an injection head for a liquid-propelled rocket engine.

Known injection heads for liquid-propelled rocket engines have a number of first injection bores for injecting jets of a first propellant constituent into the combustion chamber of a rocket engine, and a number of second injection bores for injecting jets of a second propellant constituent into the combustion chamber, such that the propellant constituents are mixed.

The injection head of the rocket engine must ensure a complete combustion of the propellant with a low combustion chamber volume by effective mixture processing, and must provide a homogeneous combustion gas mixture, a high combustion stability, and, if possible, low injection pressure losses. Furthermore, unacceptably high heat entry at the walls of the combustion chamber and the engine nozzle are to be avoided. Finally, the manufacturing costs should be minimized.

"Rocket Propulsion Elements" by George P. Sutton, Oscar Biblarz, Seventh Edition, Pages 271 to 276, discloses different types of injection heads for liquid-propelled rocket engines, including those which operate according to coaxial, swirl, or oblique jet injection methods. These types of injection heads have the disadvantage that propellant strands can form in the combustion chamber, in which either a rich combustion predominates due to an excess of fuel, or a lean combustion predominates as a result of an oxidation excess. On the one hand, such a strand formation impairs the combustion degree (that is, the efficiency factor of the combustion), while on the other hand, lean strands may lead to hot-gas corrosion or to spot-type excess temperatures—so-called "hot spots"—on the combustion-chamber walls, which can destroy the combustion chamber. If a thermally decomposable fuel is involved, strands with an excess of fuel may lead to local pressure peaks, which can cause high-frequency combustion instabilities.

In one of the oldest configurations, the injection heads operate according to the so-called parallel-jet spray-head injection method. These can supply a strand-free uniform mixture formation of the oxidizer and the fuel in the axial direction (that is, in the direction of the flow of the combustion gases), as well as in the radial direction, thus transversely thereto. In this case, arrangements are known in which the injection bores for the fuel or the oxidizer are alternately arranged in a checkerboard shape, in a circular shape or in a honeycomb shape. However, one disadvantage of known parallel-jet spray-head adjusting heads is that fairly large combustion chamber lengths are required to achieve high combustion efficiency and high capacity. This is essentially because, due to the parallel injection of the fuel and the oxidizer, both constituents come in contact only gradually; thus their reaction takes place only after a relatively long distance.

One object of the present invention is to provide an injection head for a liquid-propelled rocket engine which makes it possible to achieve complete, uniform and stable combustion, even at a short combustion chamber length.

This and other objects and advantages are achieved by the liquid propellant injection head according to the invention, which has a number of first injection bores and a number of second injection bores for injecting propellant jets of a first propellant constituent and of a second propellant constituent respectively into the combustion chamber of the rocket engine with the mutual mixing of the propellant constituents. According to the invention, the first injection bores inject jets of the first propellant constituent with a high impulse, while the second injection bores inject jets of the second propellant constituent with a low impulse. In addition, the first and second injection bores are arranged with respect to one another such that an admixing of the second propellant constituent with the first propellant constituent takes place with an ejector effect of the propellant jets of the first propellant constituent leaving the first injection bores.

One advantage of the injection head according to the invention is that, by parallel injection of the two propellant constituents (and thus of the propellant and the oxidizer), the propellants typically are not mixed in the liquid phase, but not before the gaseous phase, so that high-frequency combustion instabilities are avoided. Another advantage is that the quality of the injection head is relatively insensitive to manufacturing tolerances at the individual injection bores; that is, due to the large number of injection bores, a variation in dimension of individual bores plays only a subordinate role in the composite, and is therefore usually negligible. This is advantageous with respect to expenditures and costs of the manufacturing.

Another important advantage of the injection head according to the invention is that it can achieve a high combustion efficiency of the liquid-propelled rocket engine, due to a high characteristic velocity and thus a high specific output of the engine. Finally, because of a lower susceptibility to dot-type overheating, the operating range of the rocket engine can be considerably expanded. Thus, in comparison to other injection methods, the engine can still be operated in an absolutely stable manner, even with significantly lower injection pressures.

In a preferred embodiment of the invention, the first injection bores have a small flow cross-section for generating the propellant jets of the first propellant constituent with a high impulse, and the second injection bores have a large flow cross-section, for generating the propellant jets of the second propellant constituent with a low impulse.

Preferably, the first injections bores and the second injection bores lead out at the surface of an injection plate bounding the injection head on the combustion chamber side. In a particularly preferred embodiment of the injection head according to the invention, the second injection bores on the surface of the injection plate have a first area with a large flow cross-section for generating the propellant jets of the second propellant constituent with a low impulse, and, upstream with respect to the flow direction of the second propellant constituent, a second area with a small flow cross-section. The second area with the small flow cross-section in the second injection bores is advantageously used to generate a large injection pressure difference, benefiting the hydraulic uncoupling of the propellant delivery system and the combustion chamber.

The injection bores are preferably arranged with their axes parallel to one another.

According to a preferred embodiment of the invention, the first injection bores and the second injection bores are arranged alternately, and optionally.

Alternatively, they may be arranged alternately in a circular manner, or in a honeycomb-shaped manner.

Advantageously the first injection bores have a diameter of from 0.05 to 0.5 mm (preferably from 0.05 to 0.15 mm), while the second injection bores have a diameter of from 0.2 to 2 mm (preferably from 0.3 to 1.2 mm). In addition, the distance between the first injection bores and the second injection bores is advantageously smaller than 2 mm, and preferably smaller than 1 mm.

Other objects, advantages and novel features of the present invention will become apparent from the following detailed description of the invention when considered in conjunction with the accompanying drawings.

BRIEF DESCRIPTION OF THE DRAWINGS

FIGS. 4a) to c) are schematic top views of different possible arrangements for the injection bores of the injection head according to the invention; and FIG. 5a) to c) is a schematic view of a possible scaling of the injection head by a variation of the number of injections bores, with a constant dimensioning of the bores.

DETAILED DESCRIPTION OF THE DRAWINGS

Figure 1A:
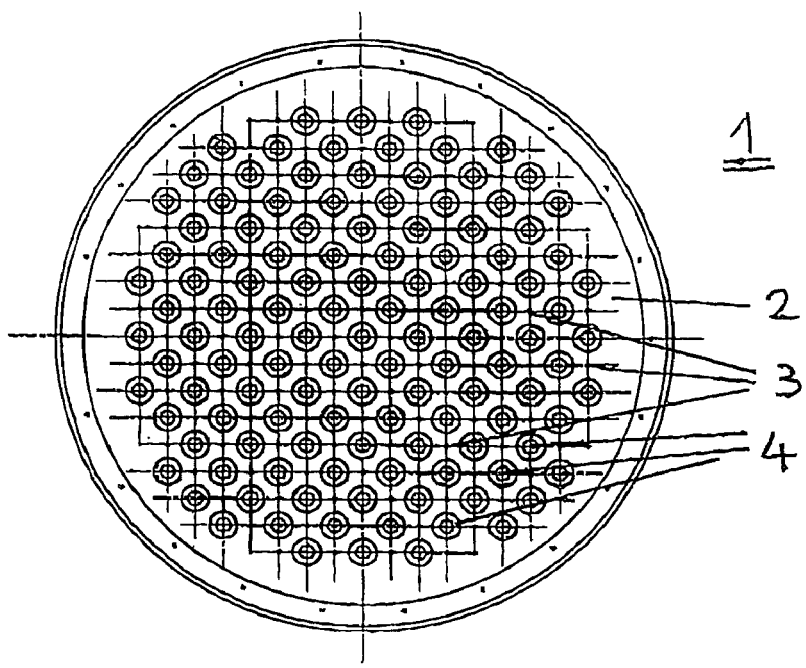
FIGS. 1a) and b) are a top view and a partially lateral sectional view of an injection head for a liquid-propelled rocket engine according to an embodiment of the invention.

FIGS. 1a) and b) illustrate an injection head 1 for a liquid-propelled rocket engine. The injection head 1 has a number of first injection bores 3 for injecting propellant jets of a first propellant constituent and a number of second injection bores 4 for injecting propellant jets of a second propellant constituent into the combustion chamber 8 of the rocket engine, which is shown schematically in FIG. 1b). The first propellant constituent may be a fuel; the second propellant constituent may be an oxidizer or vice-versa.

The first injection bores 3 and the second injection bores 4 lead out at the surface 2a of an injection plate 2 bounding the injection head 1 toward the combustion chamber 8. The first injection bores 3 have a relatively small flow cross-section, so that the propellant jets of the first propellant constituent are ejected therefrom at a high velocity and thus with a high impulse. In contrast, the second injection bores 4 have a relatively large flow cross-section, so that the propellant jets of the second propellant constituent are ejected therefrom at a relatively low velocity, and thus with a relative low speed. The first and second injection bores 3, 4 are arranged with respect to one another such that an admixing of the second propellant constituent, which leaves the second injection bores 4 at a low impulse, takes place under an ejector effect of the propellant jets of the first propellant constituent leaving the first injection bores 3 with a high impulse (relative to the last-mentioned propellant constituent).

Figure 1B:
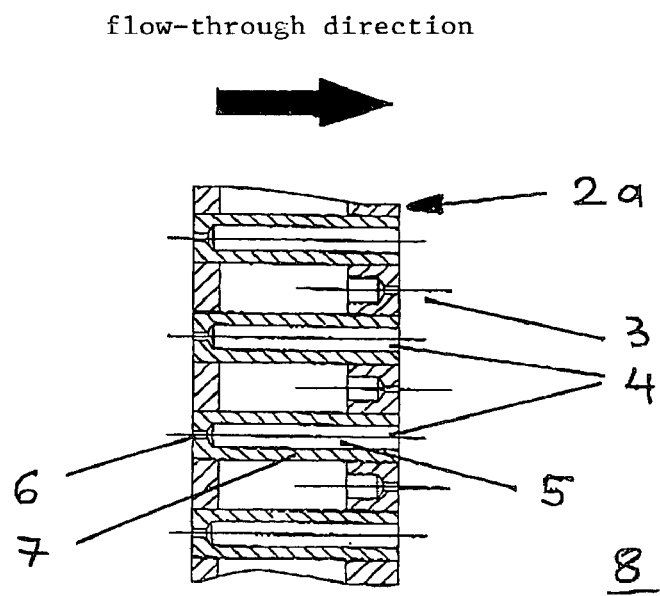

As illustrated in FIG. 1b), the first and second injection bores 3, 4 are arranged alternately; with their axes parallel to one another. As illustrated in FIG. 1a, a checkerboard-type alternating arrangement of the first injection bores 3 and of the second injection bores 4 is provided.

Figure 2:
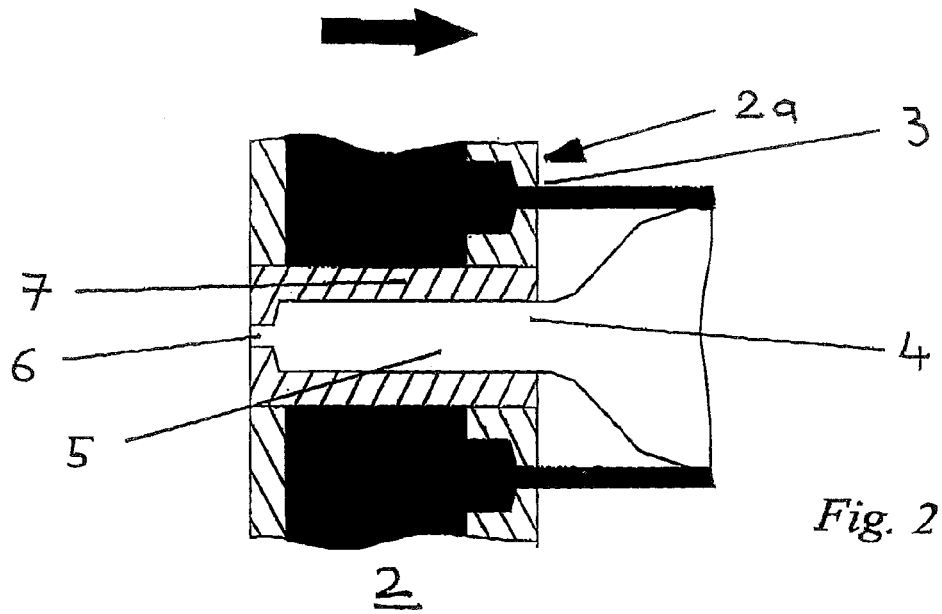
FIG. 2 is an enlarged cutout of FIG. 1b) for explaining the result of an ejector effect utilized for mixing the propellant constituents in the present invention.

As illustrated in FIG. 2, on the surface 2a of the injection plate 2, the second injection bores 4 have a first area 5 with a large flow cross-section, so as to generate the jets of the second propellant constituent with a low impulse. Upstream with respect to the flow direction of the second propellant constituent (and thus away from the surface 2a of the injection plate 2), a second area 6 with a small flow cross-section, is provided in order to generate a large injection pressure difference used for the hydraulic uncoupling of the propellant delivery and the combustion chamber, and thus for stabilizing the combustion. The second injection bores 4 may be implemented by a nozzle insert 7.

Figure 3:
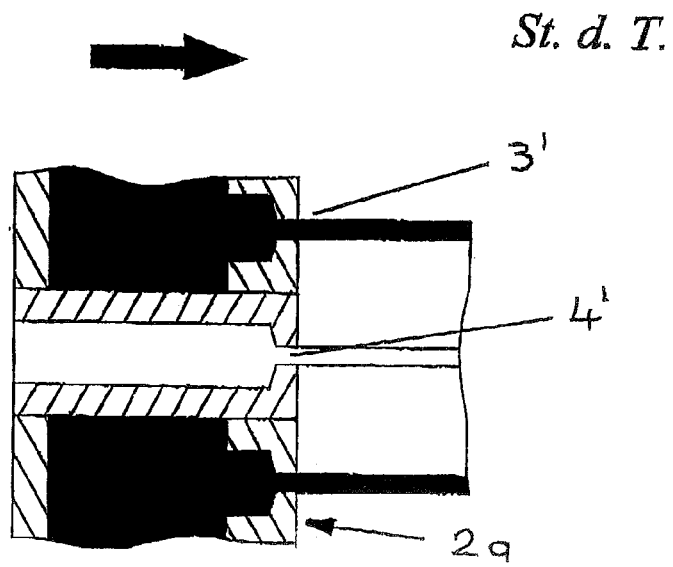
FIG. 3 is a comparative representation similar to FIG. 2 for a conventional parallel-jet injection method according to the state of the art.

In contrast, FIG. 3 shows an arrangement of first and second injection bores 3', 4' of an injection head according to a conventional parallel-jet spray-head injection method according to the prior art. Here, the first and second injection bores 3', 4' essentially have the same cross-section, and no mixing of the constituents under an ejector effect takes place in comparison to the invention.

Returning to the present invention, the first injection bores 3 may have a diameter of from 0.05 to 0.5 mm, and preferably from 0.05 to 0.15 mm. The second injection bores 4, on the other hand, may have a diameter of from 0.2 to 2 mm (preferably from 0.3 to 1.2 mm). These are dimensions which are advantageous for most application cases; however, dimensions outside these ranges are also possible. The distance between the center axes of the first injection bores 3 and the second injection bores 4 is preferably smaller than 2 mm, and particularly smaller than 1 mm.

FIGS. 4a) to c) are schematic views of several types of the alternating arrangement of first injection bores 3 and second injection bores 4. FIG. 4a) shows a checkerboard alternating arrangement of the first injection bores 3 and the second injection bores 4, as also chosen in the embodiment illustrated in FIG. 1a), while FIG. 4b) shows a circular alternating arrangement of the first injection bores 3 and of the second injection bores 4. Alternating first injection bores 3 and second injection bores 4 are provided on each of the illustrated circles. Finally, FIG. 4c) shows a honeycomb-shaped alternating arrangement of the first and second injection bores 3, 4. For example, a first injection bore 3 is in each case provided in the center of a honeycomb; a second injection bore 4 is correspondingly provided at each corner point of the honeycomb.

FIG. 5 is a schematic view of the possibilities for scaling of the injection head by varying the number of injection bores, while their dimensioning stays the same. It is also possible to create injection heads for liquid-propelled rocket engines of different capacities with the same dimensions but different numbers of first and second injection bores.

In the embodiment illustrated in FIGS. 1a and b), the first injection bores 3 are provided for injecting jets of the first propellant constituent with a large impulse, and the second injection bores 4 are provided for injecting jets of the second propellant constituent with a low impulse. The second propellant constituent is admixed with the first propellant constituent under an ejector effect of the propellant jets of the first propellant constituent leaving the first injection bores 3. As indicated above, the first propellant constituent may, for example, be the propellant and the second propellant constituent may be the oxidizer, or vice-versa.

The second propellant constituent leaves the second injection bores 4 with a very low impulse and is then, under the ejector effect, admixed with the propellant jets of the first propellant constituent leaving the first injection bores 3 with a high impulse, as illustrated in FIG. 2. Here, the mixing of the two propellant constituents essentially already takes place in the gaseous phase, which is advantageous with respect to the uniformity and stability of the combustion. Since the contact of the two propellant constituents occurs shortly after leaving the injection head 1, the combustion chamber 8 may have a considerably shorter construction than in the case of the conventional parallel-jet spray-head injection system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An injection head for a liquid-propelled rocket engine having a number of first and second injection bores for injecting jets of a first propellant constituent and of a second propellant constituent, respectively, into a combustion chamber of a rocket engine, with the mutual mixing of propellant constituents, wherein:

the first injection bores are configured to inject jets of the first propellant constituent with a high impulse;
   the second injection bores are configured to inject jets of the second propellant constituent with a low impulse;
   the first and second injection bores are mutually arranged such that an admixing of the second propellant constituent with the first propellant constituent takes place under an ejector effect of the propellant jets of the first propellant constituent leaving the first injection bores;
   the first injection bores have a small flow cross-section for generating the jets of the first propellant constituent with a high impulse;
   the second injection bores have large flow cross-section for generating the jets of the second propellant constituent with a low impulse;
   the first injection bores and the second injection bores lead out at the surface of an injection plate bounding the injection head on a combustion chamber side;
   on the surface of the injection plate, the second injection bores have a first area with a large flow cross-section provided for generating the jets of the second propellant constituent with a low impulse and, upstream with respect to the flow direction of the second propellant constituent, a second area with a small flow cross-section;
   the injection bores are arranged with their axes parallel to one another; and
   the first injection bores and the second injection bores are arranged alternately in an alternating checkerboard configuration.

2. An injection head for a liquid-propelled rocket engine having a number of first and second injection bores for injecting jets of a first propellant constituent and of a second propellant constituent, respectively, into a combustion chamber of a rocket engine, with the mutual mixing of propellant constituents, wherein:

the first injection bores are configured to inject jets of the first propellant constituent with a high impulse;
   the second injection bores are configured to inject jets of the second propellant constituent with a low impulse;
   the first and second injection bores are mutually arranged such that an admixing of the second propellant constituent with the first propellant constituent takes place under an ejector effect of the propellant jets of the first propellant constituent leaving the first injection bores;
   the first injection bores have a small flow cross-section for generating the jets of the first propellant constituent with a high impulse;
   the second injection bores have a large flow cross-section for generating the jets of the second propellant constituent with a low impulse;
   the first injection bores and the second injection bores lead out at the surface of an injection plate bounding the injection head on a combustion chamber side;
   on the surface of the injection plate, the second injection bores have a first area with a large flow cross-section provided for generating the jets of the second propellant constituent with a low impulse and, upstream with respect to the flow direction of the second propellant constituent, a second area with a small flow cross-section;
   the injection bores are arranged with their axes parallel to one another;
   the first injection bores and the second injection bores are arranged alternately in a honeycomb configuration;
   the first injection bores have a diameter of from 0.05 to 0.5 mm;
   the second injection bores have a diameter of from 0.2 to 2 mm.

3. The injection head according to claim 2, wherein the first injection bores have a diameter of from 0.05 to 0.15 mm.

4. The injection head according to claim 2, wherein a distance between the first injection bores and the second injection bores is smaller than 2 mm.

5. The injection head according to claim 4, wherein a distance between the first injection bores and the second injection bores is smaller than 1 mm.

* * * * *